United States Patent [19]
Wolf et al.

[11] Patent Number: 5,256,021
[45] Date of Patent: Oct. 26, 1993

[54] TELESCOPE VEHICLE LOADING AND UNLOADING SYSTEM

[76] Inventors: James M. Wolf, 253 W. William St., Delaware, Ohio 43015; Charles Keip, 5820 Canal Ave., Grandville, Mich. 49418

[21] Appl. No.: 710,143

[22] Filed: Jun. 4, 1991

[51] Int. Cl.$^5$ .................................. B65G 17/00
[52] U.S. Cl. ...................... 414/393; 198/517; 198/512; 198/812; 198/308.1; 414/676; 414/345; 414/398; 414/680
[58] Field of Search ............... 414/390, 391, 393, 398, 414/527, 528, 340, 344, 345, 680, 351, 353; 198/308.1, 525, 517, 512, 812, 594

[56] References Cited

U.S. PATENT DOCUMENTS

| | | |
|---|---|---|
| 1,453,393 | 5/1923 | Jessen . |
| 2,260,587 | 10/1941 | Shields . |
| 2,312,779 | 3/1943 | Smith . |
| 2,367,970 | 1/1945 | Smoker ........................ 198/512 X |
| 2,627,960 | 2/1953 | Eberle . |
| 2,743,025 | 4/1956 | Manierre . |
| 3,197,021 | 7/1965 | Williams . |
| 3,236,393 | 2/1966 | Girardi . |
| 3,237,757 | 3/1966 | Perkins . |
| 3,391,776 | 7/1968 | Hancock et al. ............... 198/517 X |
| 3,596,785 | 8/1971 | Weatherford . |
| 3,788,452 | 1/1974 | McWilliams . |
| 3,811,583 | 5/1974 | Weeks .......................... 414/676 X |
| 3,885,682 | 5/1975 | McWilliams . |
| 4,011,937 | 3/1977 | Brandtjen ..................... 198/517 |
| 4,053,070 | 10/1977 | Rozeboom . |
| 4,162,727 | 7/1979 | Summers . |
| 4,281,955 | 8/1981 | McWilliams . |
| 4,571,145 | 2/1986 | Hunter ........................ 198/517 X |
| 4,643,299 | 2/1987 | Calundan . |
| 4,832,553 | 5/1989 | Grey et al. . |
| 4,917,566 | 4/1990 | Chauvin . |
| 4,946,027 | 8/1990 | Jenkins . |
| 5,067,867 | 11/1991 | Ruder et al. .................. 414/391 |

FOREIGN PATENT DOCUMENTS

| | | | |
|---|---|---|---|
| 206913 | 11/1955 | Australia ..................... | 198/812 |
| 51617 | 4/1977 | Japan .......................... | 414/398 |

*Primary Examiner*—Frank E. Werner
*Attorney, Agent, or Firm*—Robert R. Jackson; Adam T. Bernstein

[57] ABSTRACT

The apparatus and method of this invention safely and efficiently loads and unloads the contents of a load transport container. A manipulator mechanism such as a backhoe having a hemispherical spiked tool at the end of a manipulator arm is mounted on a telescoping conveyor belt system. Right hand and left hand ¼ turn drive conveyors are used at the front end of the telescoping conveyor belt system to facilitate movement of cargo from the front end of the system to the discharge end. The main conveyor belt has a ribbed design.

13 Claims, 7 Drawing Sheets

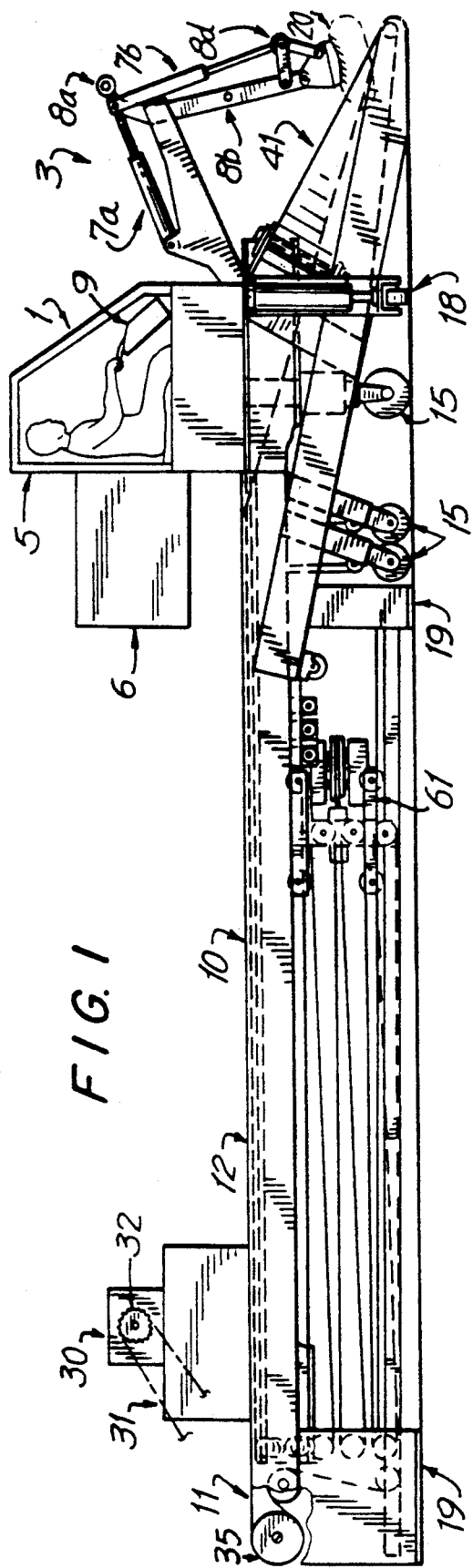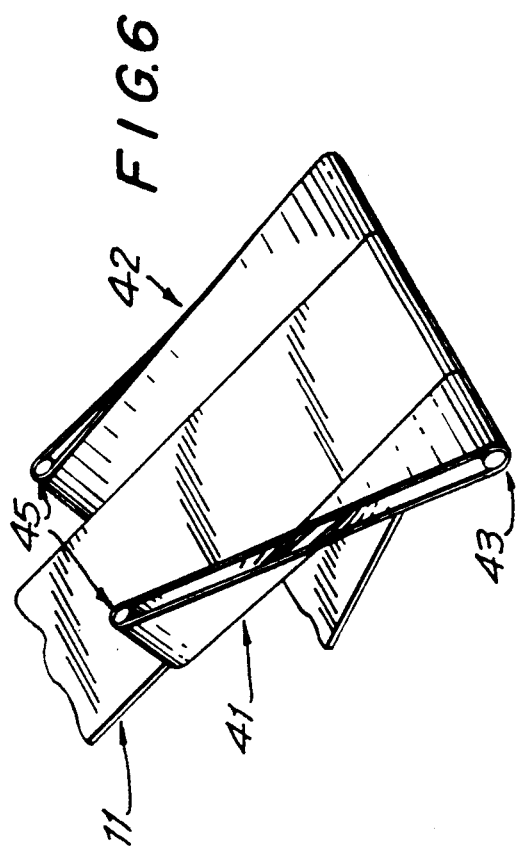

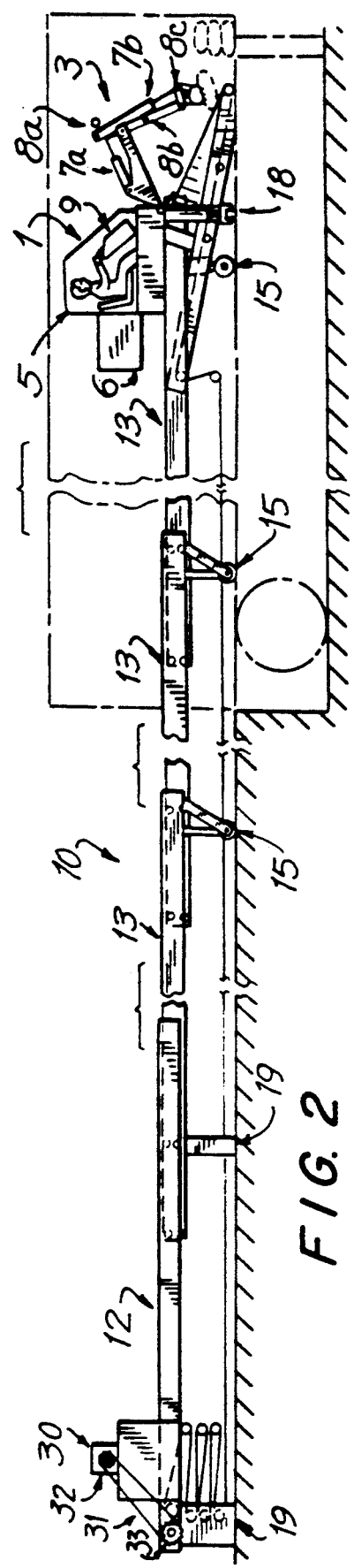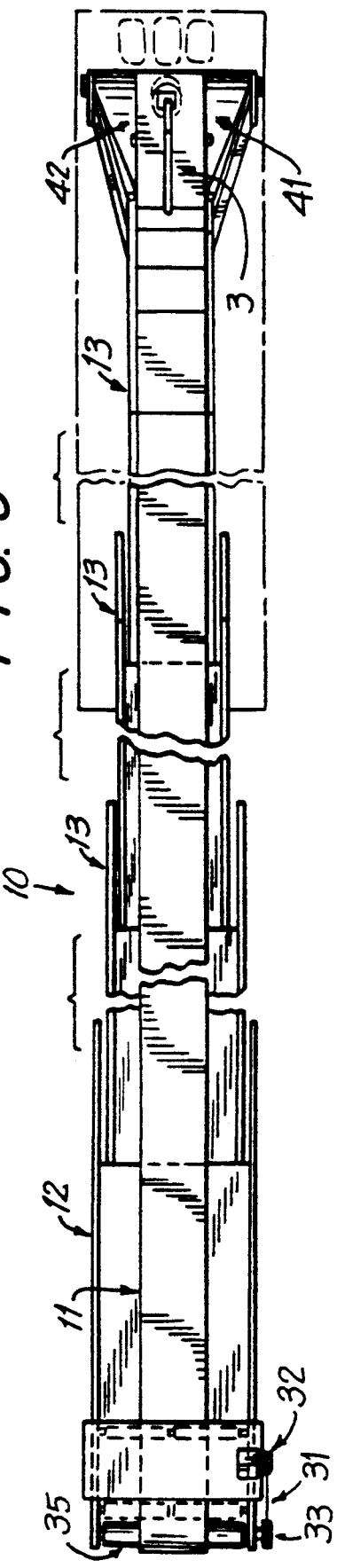

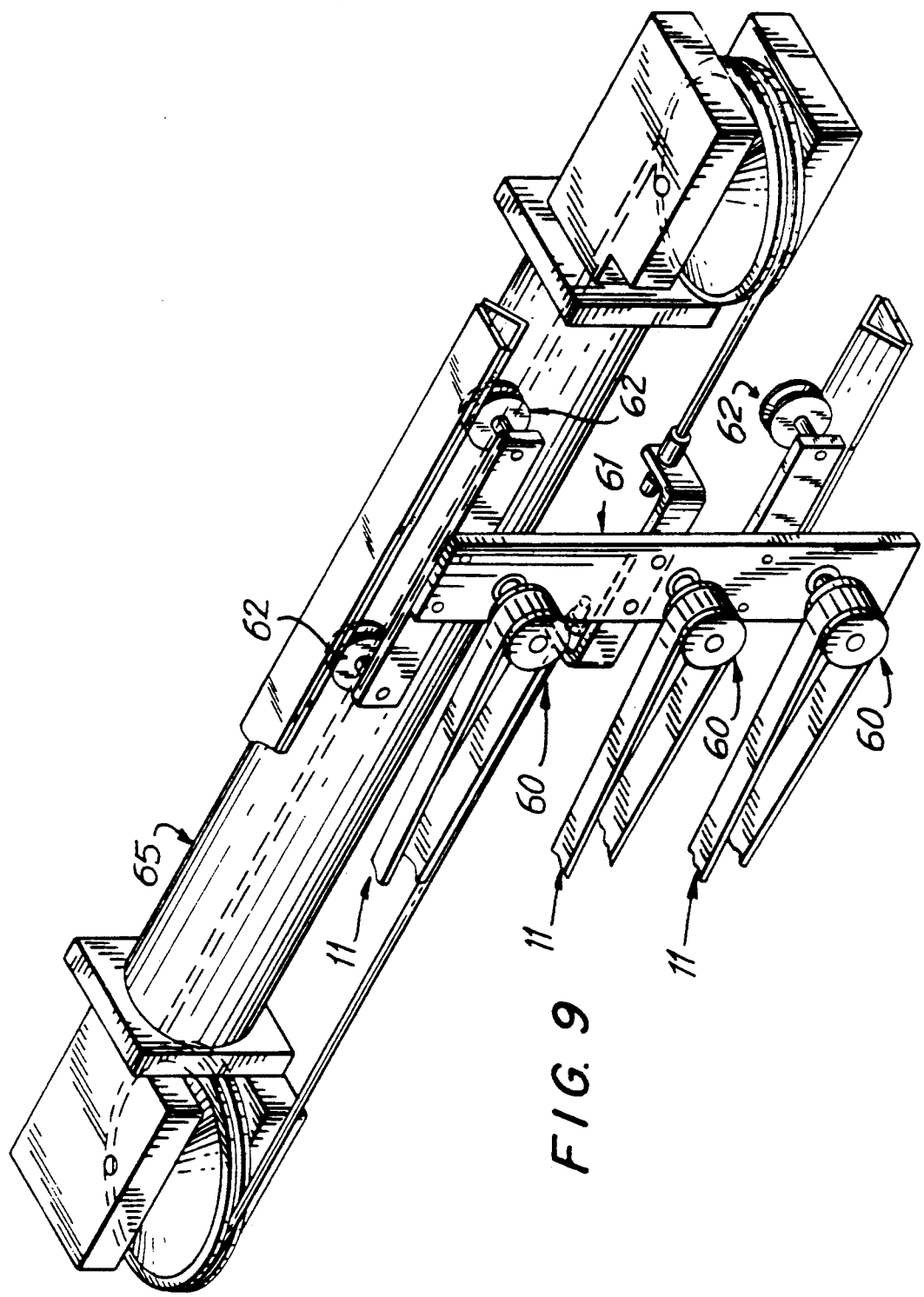

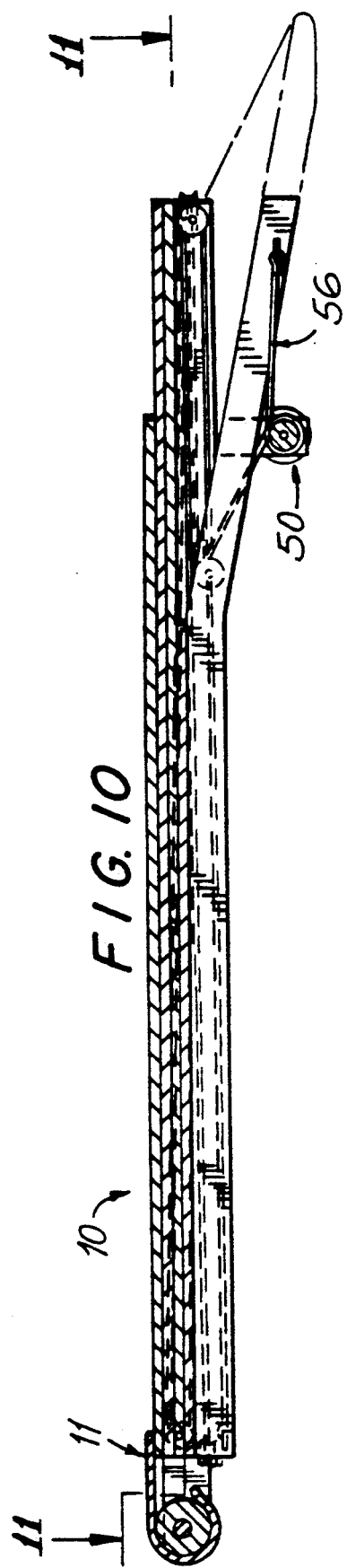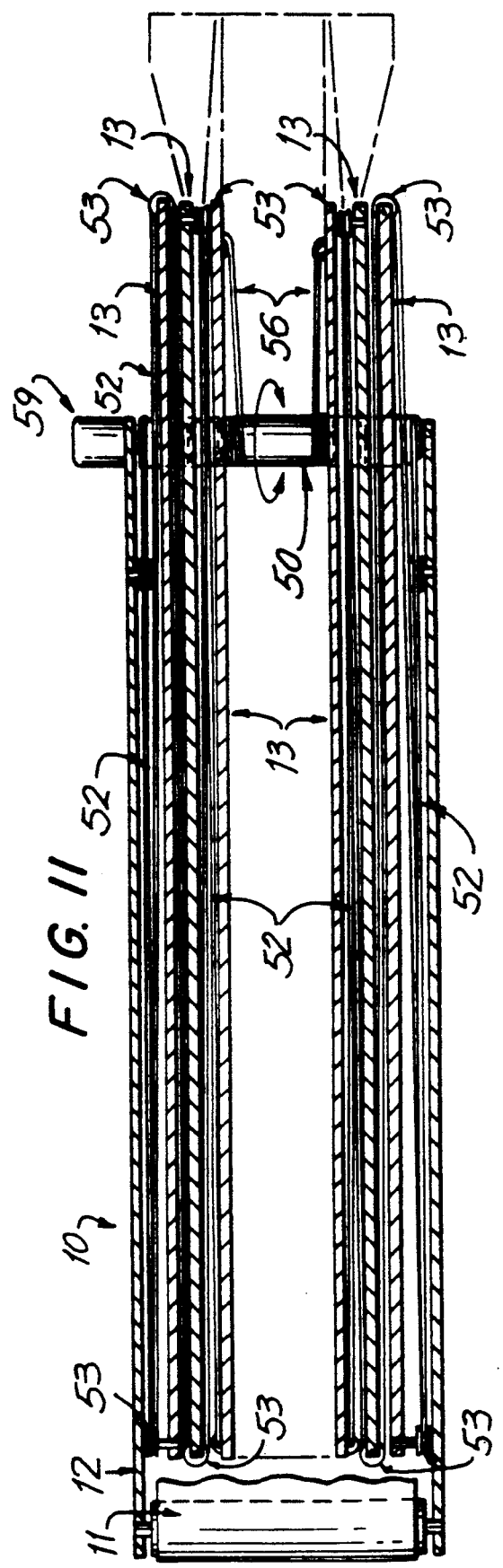

TELESCOPE VEHICLE LOADING AND UNLOADING SYSTEM

BACKGROUND OF THE INVENTION

The apparatus and method of this invention permits handling of bulky and heavy products in industrial and warehouse settings yet minimizes the physical labor required by workers.

More specifically, the apparatus and method of this invention relates to a means for loading or unloading cargo from a transportation vehicle. Such cargo can be, for example, paper, boxes, plastic bags or coffee bean bags. Such transportation vehicles can be, for example, semi-trailer trucks or railroad cars. Although this invention is described in terms of its applicability to handling bags of coffee beans transported in a semi-trailer truck, it is to be understood that the invention is not limited to that specific application.

Coffee beans are generally transported in bags weighing between 100 pounds (45.36 Kg) and 150 pounds (68.04Kg). These bags usually arrive at a processing plant by semi-trailer truck. These bags must then be transferred from the semi-trailer truck to a position inside the processing plant for subsequent processing.

Typically these bags are removed from the semi-trailer truck by workers. These workers stack the bags on pallets which are then carried by a forklift or similar mechanism to appropriate positions in the processing plant. Alternatively, a conveyor belt can be used to remove the bags from the semi-trailer truck. However, this alternate method also requires workers to place the bags on the conveyor belt and to remove the bags from the discharge end of the conveyor belt and place them on pallets. In addition, this alternate method requires the conveyor belt to be constantly moved forwardly into the body of the semi-trailer truck as the bags are removed therefrom.

Both of these methods of unloading the contents of a semi-trailer truck have several disadvantages. For example, both methods are relatively inefficient because of the plurality of workers needed to place the bags on a conveyor belt to unload the semi-trailer truck. In addition, both methods require substantial physical labor which can be strenuous unless ample safety precautions are observed.

SUMMARY OF THE INVENTION

It is therefore an object of this invention to provide a system that can more safely handle cargo shipped in a variety of transportation vehicles.

It is another object of this invention to provide a system that can efficiently handle cargo shipped in a variety of vehicles.

In accordance with this invention, there is provided a system for more safely and efficiently handling the cargo shipped in various transportation vehicles. This system comprises the use of a manipulator means, such as a backhoe with a manipulator arm, in conjunction with a movable telescoping conveyor system. In the preferred embodiment, a backhoe is used and has a hemispherical spiked tool located at the end of the manipulator arm. This arrangement is used to transport cargo onto the movable telescoping conveyor system. A main ribbed conveyor belt design is used to ensure the movement of the cargo along the conveyor belt of the movable telescoping conveyor system away from the transportation vehicle. In addition, right hand and left hand ¼ turn drive conveyors are integrated into the infeed section of the movable telescoping conveyor system to facilitate movement of the bags onto the main ribbed conveyor belt.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which:

FIG. 1 is a side elevation view of an embodiment of the invention with the movable telescoping conveyor system in a retracted position;

FIG. 2 is a side elevation view of an embodiment of the invention shown in operation between a loading dock and an end loading semi-trailer truck with the movable telescoping conveyor system in an extended position;

FIG. 3 is a top plan view of an embodiment of the invention shown in operation between a loading dock and an end loading semi-trailer truck with the movable telescoping conveyor system in an extended position;

FIG. 6 is a perspective view of the front end of the movable telescoping conveyor system;

FIG. 9 is a perspective schematic diagram showing the mechanism that allows the conveyor belt to travel with the telescoping conveyor system;

FIG. 10 is a side elevation schematic diagram of an embodiment of the invention in a retracted position showing the arrangement of the cable system for extending and retracting the movable telescoping conveyor system; and FIG. 11 is a top plan schematic diagram of an embodiment of the invention in a retracted position showing the arrangement of the cable system for extending and retracting the movable telescoping conveyor system.

Figure 4:
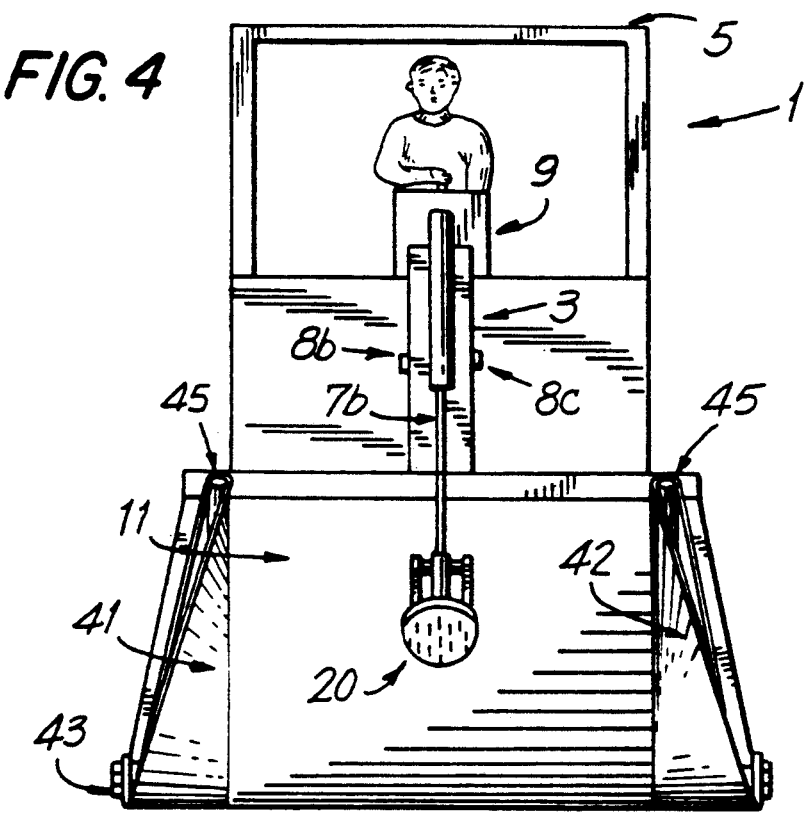
FIG. 4 is a front elevation view of an embodiment of the invention showing the backhoe, manipulator arm, spiked tool and front end on the movable telescoping conveyor system.
Figure 5:
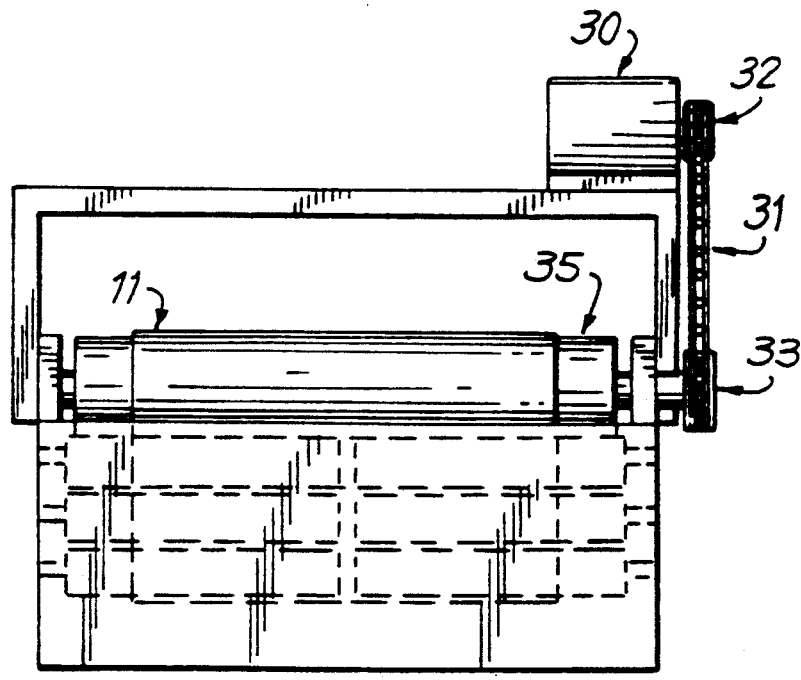
FIG. 5 is a rear elevation view of an embodiment of the invention showing the drive system for the conveyor belt.
Figure 7:
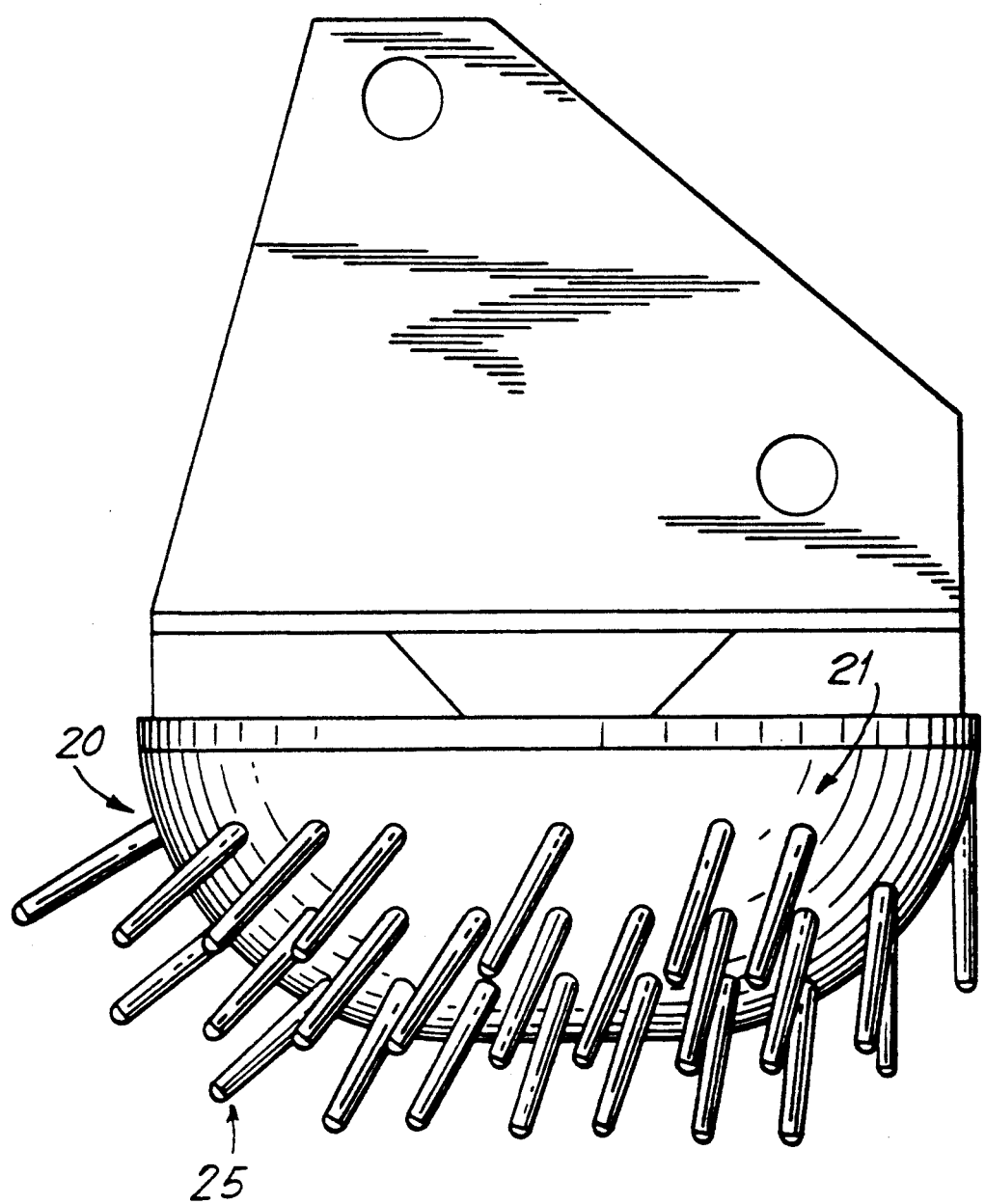
FIG. 7 is an enlarged side elevation view of one embodiment of the spiked tool of the apparatus of the invention.

It is to be understood that FIGS. 1, 2, 7, and 10 show only one side of the apparatus of the invention but that the other side is a mirror image of what is shown in those FIGURES.

DETAILED DESCRIPTION OF THE PREFERRED EMBODIMENT

Although this Detailed Description describes the invention in terms of its applicability to unloading bags of coffee beans from semi-trailer trucks, it is to be understood that this invention can be used to load as well as unload any industrial type of transportation vehicle. Furthermore, the invention is not limited to a particular type of cargo that can be handled.

The semi-trailer trucks that transport food products, such as bags of coffee beans, are standard trailer vans and sea or land containers that are typically 20 feet (6.16m), 40 feet (12.19m), 45 feet (13.72m), 48 feet (14.63m) or 52 feet (15.85m) in length and 8 feet (2.44m) wide and 8 feet (2.44m) high. Coffee beans are generally shipped in bags weighing between 100 pounds (45.36kg) and 150 pounds (68.03 Kg). The bags are sewn of woven burlap, jute and grass fibers. In addition, the bags are usually 36 inches (91.44cm) long, 24 inches (60.96cm) wide and 8 inches (20.32cm) thick. The bags are generally shipped in the semi-trailer truck stacked on the floor to a height of about three feet (0.91m) in semi-trailer trucks that are over 40 feet (12.19m) long and to a height of about seven feet (2.13m) in the 20 foot (6.16m) semi-trailer trucks. In that environment, this invention is capable of unloading bags of coffee beans or other similar cargo from semi-trailer trucks at a rate of about ten bags per minute.

This invention comprises the combination of a manipulator means, such as standard backhoe 1 having a hemispherical spiked tool 20 at the end of a manipulator arm 3, and a movable telescoping conveyor system 10. One operator controls backhoe 1 and movable telescoping conveyor system 10. The main conveyor belt 11 has a ribbed design to prevent the bags from slipping off. Movable telescoping conveyor system 10 can extend and retract even when it is fully loaded with bags.

A standard Kabuto Model 250 backhoe is preferably used. However, it is within the scope of this invention to use other manipulator means, such as a pneumatic manipulator or a robot using DC servos. Backhoe 1 is preferably mounted astride the centerline of movable telescoping conveyor system 10 adjacent its front end. Of course, backhoe 1 could be mounted along either side of movable telescoping conveyor system 10. Backhoe 1 is pinned through its mounting frame to the tubular steel frame of movable telescoping conveyor system 10. A safety cage 5 is also bolted to the tubular steel frame of movable telescoping conveyor system 10. An hydraulic power pack 6 for backhoe 1 is mounted to a shelf that is part of the operator platform and safety cage 5.

One operator sits directly behind manipulator arm 3 on the operator platform. The position of the operator above movable telescoping conveyor system 10 and behind manipulator arm 3 ensures a safe, easy one-person operation. In addition, the operator's position provides an unobstructed view to control manipulator arm 3 and movable telescoping conveyor system 10. From this position, the operator can control manipulator arm 3 to move the bags onto the front end of movable telescoping conveyor system 10. The operator also controls extension and retraction of movable telescoping conveyor system 10 from this position.

The hydraulic control system for the Kabuto 250 backhoe has been modified in order for backhoe 1 to efficiently unload a semi-trailer truck. A hydraulic power pack such as a Bond Hydraulic Power Unit KX50022 with a 7½ HP (5.59 kw) 1800/230/460/TEFC Motor, fixed displacement 2D40AAC, 12.42 GPM (0.05 M$^3$PM) pump, and a 20 gallon (0.08 M$^3$) JIC hydraulic reservoir, 0-1000 psi gauge (0-6894.78 Kpascal) and shutoff, FI ¾, 10 mic RL filter with dirt indicator gauge is used in place of the standard tractor hydraulic system used in the Kabuto 250 backhoe. In addition, flow control valves are used in the lines feeding the swing cylinders 7a and 7b. These flow control valves control the swing speed and prevent overtravel of manipulator arm 3 when the flow control valves are released. Thus the action of manipulator arm 3 is smoother and the movement at the end of the swing is dampened.

The system hydraulic pressure is preferably set at 500 psi (3447.39 Kpascal). This provides adequate pressure for smooth operation but is not so high as to cause strains on the system that might lead to hose failures and leakage. Typically the system pressure can be between 125 psi (861.85 Kpascal) and 1000 psi (6894.78 Kpascal). In addition, an FDA approved hydraulic fluid is used to avoid contamination of the food products being unloaded from the semi-trailer truck in the event of an undetected leak. For example, preferably Lubriplate FMO-350 hydraulic fluid is used.

Electrical limit switches 8a, 8b, 8c and 8d are placed at various locations on manipulator arm 3. (See FIGS. 1 and 4.) Preferably Allen Bradley 802T-AP limit switches are used. If any of limit switches 8a, 8b, 8c or 8d on manipulator arm 3 contacts an obstruction, such as the inside wall of the semi-trailer truck, a dump valve is activated to dump hydraulic fluid from manipulator arm 3 into the reservoir. This prevents the operator from inadvertently driving manipulator arm 3 through the sides or roof of the semi-trailer truck.

As seen in FIG. 1, limit switch 8a is placed on manipulator arm 3 adjacent the joint located at about the midpoint of manipulator arm 3. Limit switch 8a is located at the top of this joint to prevent manipulator arm 3 from being driven through the roof of the semi-trailer truck. In addition, as seen in FIGS. 1 and 4, preferably three limit switches 8b, 8c and 8d are located adjacent the segment of manipulator arm 3 controlled by swing cylinder 7b. Limit switches 8b and 8c are located on either side of manipulator arm 3 with limit switch 8d located in front of manipulator arm 3. The location of these limit switches prevents manipulator arm 3 from being driven through the sides of the semi-trailer truck.

The operator's hydraulic manifold 9 has been shortened and pitched back to provide the operator with an unobstructed view of the infeed section of movable telescoping conveyer system 10. The joystick levers have also been bent to provide a more comfortable operator position.

When it is necessary to move the unit from side to side to another dock door, AEROGO 21 square inch (0.014 m$^2$) air floatation pads 19 are inflated with 25 psi (172.37 Kpascal) compressed air to lift the fixed housing 12 of movable telescoping conveyor system 10. Air flotation pads 19 are located at the four corners of fixed housing 12. Forward travel wheels 15, which provide adjustable support for the front end of movable telescoping conveyor system 10, are raised by means of pneumatic cylinders. The cross travel wheels 18 on the front of movable telescoping conveyor system 10 are extended using a hydraulic cylinder. A Dayton Speedaire air motor model 4Z231 through a Dodge Tigear 56/262-50,K1 gear reducer (not shown) may be used to drive cross travel wheels 18 to facilitate side to side movement of the unit. When the Kabuto Model 250 backhoe is used, the hydraulic cylinders for the backhoe stabilizer are modified to become cross travel wheels 18.

Hemispherical spiked tool 20 at the end of manipulator arm 3 is used to move the bags onto the front end of movable telescoping conveyor system 10. Of course, other means, such as a vacuum pickup arrangement, could be used to move the bags or other cargo onto movable telescoping conveyor system 10. The spikes 25 protrude at fixed angles. Preferably spikes 25 are inserted at a 45 degree angle to the base 21 at the front of hemispherical spiked tool 20. This angle increases to a 90 degree angle to base 21 at the back of tool 20. In addition, spikes 25 in the middle of hemispherical spiked tool 20 are arranged at a 45 degree angle from the radius line at the point on base 21 through which spikes 25 protrude.

These angles allow at least one row of spikes 25 to be correctly oriented to grip the bag no matter what the orientation manipulator arm 3 of backhoe 1 has to the front end of movable telescoping conveyor 10. This greatly simplifies the control manipulation required to drag a bag onto the front end of movable telescoping conveyor system 10. It also provides the operator with the flexibility to easily grip and pick up a bag when necessary to place it on movable telescoping conveyor system 10. In other words, the varied angles of spikes 25 take advantage of the bucket roll capability of manipulator arm 3 and ensure that a number of spikes 25 are properly aligned to grab the bag no matter at what angle hemispherical spiked tool 20 is rotated.

Figure 8:
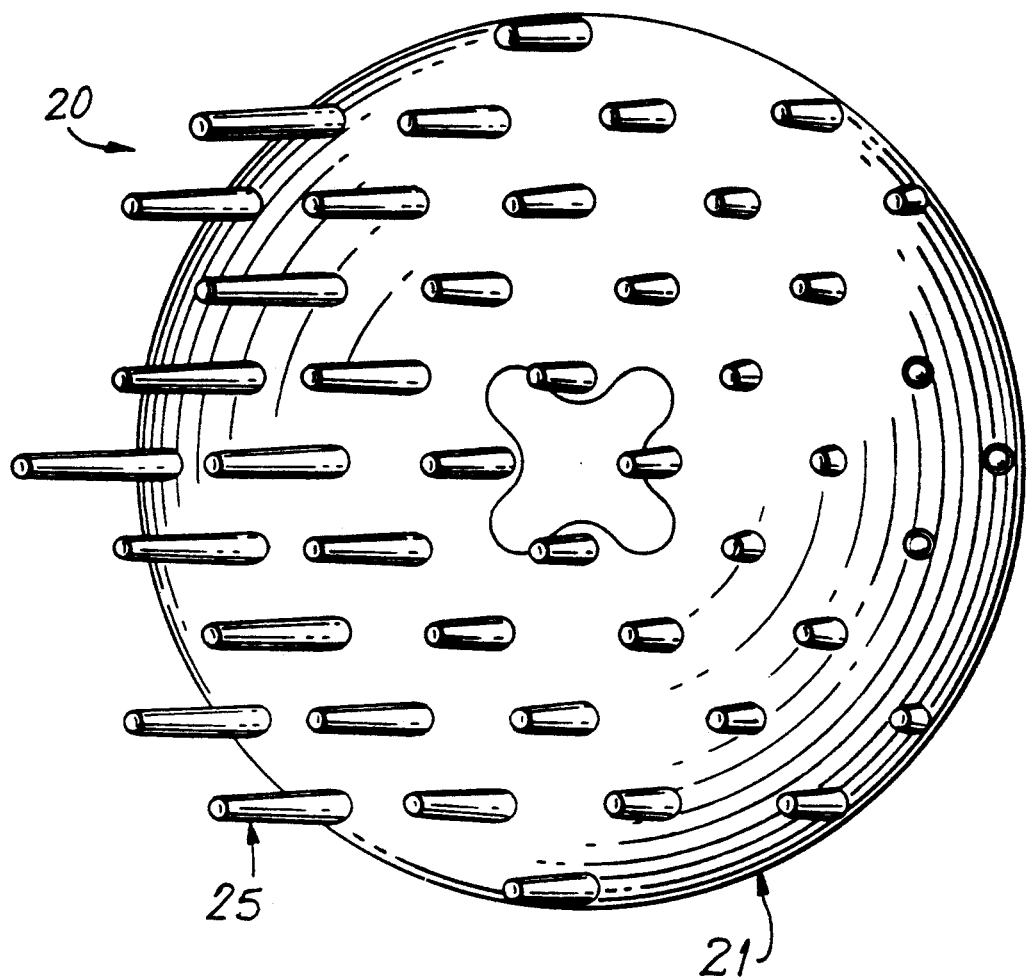
FIG. 8 is an enlarged bottom, plan view of one embodiment of the spiked tool of the apparatus of the invention.

A spike density to cloth ratio which minimizes the danger of ripping the bags and spilling the contents during unloading should be chosen. The preferred number of spikes 25 used is a function of the material used to make the bags. Bags that are made of coarse materials, such as Mexican bags, can be easily handled by one or two spikes. For bags that are not as coarse, such as Brazilian bags, it is necessary to have 4 to 6 spikes in the bags to minimize the risk of tearing the bags. Generally the higher the spike density to cloth ratio the less chance there is of tearing the bag. For typical coffee bean bags, it is preferable to have 44 spikes arranged in the configuration shown in FIG. 8.

Spikes 25 are preferably made of modified carbon steel socket head cap screws. Alternatively, stainless steel socket head cap screws could be used. These socket head screws are machined to a spike point at one end and screwed into hemispherical spiked tool 20 from the back. Base 21 is made from cast aluminum.

The front of movable telescoping conveyor system 10 is inclined. It preferably rests on the ground and travels up to the main section of movable telescoping conveyor system 10. This configuration allows backhoe 1 to drag the bags onto movable telescoping conveyor system 10 rather than having to lift the bags up onto movable telescoping conveyor system 10. The angle of the incline is dictated by the clearance of safety cage 5 of backhoe 1 inside the semi-trailer truck and the clearance between the bottom of the operator platform of backhoe 1 and the top of movable telescoping conveyor system 10. For bulky items, such as large boxes or bundles, backhoe 1 can be mounted on either side of movable telescoping conveyor system 10. Preferably an angle of about 10 degrees to about 12 degrees provides the needed room for the bags to travel under the operator platform without jamming.

In order to support the weight of backhoe 1, the front end of movable telescoping conveyor system 10 must have adequate strength. Preferably 2 inch (5.08 cm) by 4 inch (10.16 cm) tubular carbon steel is used for the frame of movable telescoping conveyor system 10 at the point where it supports backhoe 1.

Movable telescoping conveyor system 10 has a fixed housing 12 within which a plurality of belt carrying units 13 are slidably nested within one another. This slidable nesting of belt carrying units 13 may be accomplished by the use of rollers (not shown) located along the outside of each belt carrying unit 13 which fit into guide tracks (not shown) located on the inside of an adjacent belt carrying unit 13 or fixed housing 12. Each belt carrying unit 13 can be extended and retracted to change the overall length of movable telescoping conveyor system 10 and to facilitate the movement of movable telescoping conveyor system 10 into the semi-trailer truck. Main conveyor belt 11 transports the bags along movable telescoping conveyor 10.

Belt carrying units 13 are extended and retracted through the use of a twin cable and pulley system with a common cable drum. The cable drum 50 is powered by a chain drive from a reversing electric motor and gearbox 59. Preferably a Grove Gear Division, Regal Baldit Corp., FlexLine Model DMH1325-2 gearbox, 150 to 1 ratio with a Baldour 2hp 56C frame motor, 1750 rpm, 460 volt, 3 phase 60 Hz are used. One end of the extension cable 52 is fixed to one end of fixed housing 12 while the other end of extension cable 52 is fixed to cable drum 50. In between these two fixed points, extension cable 52 is threaded over pulleys 53 fixed at each end of each belt carrying unit 13. One end of retraction cable 56 is connected to cable drum 50. The other end of retraction cable 56 is connected to the inclined portion of the front end of movable telescoping conveyor system 10. When motor 59 causes cable drum 50 to rotate, extension cable 52 is wound onto cable drum 50 while retraction cable 56 is extended. This causes movable telescoping conveyor system 10 to extend. Similarly, when the electric motor causes cable drum 50 to rotate in the opposite direction, extension cable 52 is extended while retraction cable 56 is retracted. This causes movable telescoping conveyor system 10 to retract.

The extension and retraction of movable telescoping conveyor system 10 is controlled at the operator station by push buttons located on the control console or by the use of two foot switches located on the floor of the operator platform. The foot switches allow the operator to control the travel of movable telescoping conveyor system 10 during the unloading operation without taking his hands off of the backhoe control levers. The control system does not constitute part of this invention and is a standard system that can be implemented by an electronic engineer of ordinary skill.

Main conveyor belt 11 is run over a plurality of rolls 60. Rolls 60 are mounted on a movable take up carriage 61. Movable take up carriage 61 travels about 18 feet along fixed housing 12. Movable take up carriage 61 is movably mounted on fixed housing 12 by means of a plurality of wheels 62 that ride along tracks in fixed housing 12. As movable telescoping conveyor system 10 is extended, the distance between movable take up carriage 61 and belt roll 35 decreases. Similarly, as movable telescoping conveyor system 10 is retracted, the distance between movable take up carriage 61 and belt roll 35 increases. This arrangement allows main conveyor belt 11 to travel with belt carrying units 13 during extension and retraction of movable telescoping conveyor system 10.

A cable air cylinder 65 mounted outside of fixed housing 12 is used to help maintain the proper belt tension. Cable air cylinder 65 has its cable mounted to movable take up carriage 61. Preferably, a Tol-O-Matic, 200-4 AT2, StL. X162 cable cylinder is used. Preferably 125 psi (861.84 Kpascal) of air is applied to cable air cylinder 65 to maintain proper belt tension. As movable telescoping conveyor system 10 extends and retracts, air is supplied to or vented from cable air cylinder 65 to compensate for movement of movable take up carriage 61.

Main conveyor belt 11 is driven by electric motor 30 in combination with the chain 31 and sprocket 32 arrangement connected to the sprocket 33 that drives belt roll 35. A Reliance Duty Master AC Motor, I.D. # P2161006F, 216 TC Frame and a Hub City Gear Box 0220-21411-521, Model 521 with a 15 to 1 ratio are used to drive main conveyor belt 11. Preferably main conveyor belt 11 travels between 50 feet (15.24m) per minute and 300 feet (91.44m) per minute. If it is desired to use this invention to unload a semi-trailer truck or railroad car the movement of main conveyor belt 11 may be reversed.

Right hand and left hand ¼ turn drive conveyors 41 and 42 are integrated into the infeed section of movable telescoping conveyor system 10. Right hand and left hand ¼ turn drive conveyors 41 and 42 are 4 feet (1.22m) long with horizontal infeed rollers 43 and vertical discharge rollers 45. Horizontal infeed rollers 43 are extensions of the infeed roller on main conveyor belt 11 which provides the motive force for right hand and left hand ¼ turn drive conveyors 41 and 42. The movement of main conveyor belt 11 causes horizontal infeed rollers 43 to rotate and therefore causes the movement of right hand and left hand ¼ turn drive conveyor 41 and 42.

Vertical discharge rollers 45 are mounted directly to the tubular frame of movable telescoping conveyor system 10. This twist causes the bags on the outside areas to roll onto main conveyor belt 11 and provide a smooth interface for the bags from manipulator arm 3 to main conveyor belt 11. This in turn minimizes the lateral forces placed on main conveyor belt 11 which could adversely affect its tracking. In addition, right hand and left hand ¼turn drive conveyors 41 and 42 minimize the distance that manipulator arm 3 must travel to place the bags on main conveyor belt 11.

Main conveyor belt 11 preferably has a ribbed design such as a 30 inch (76.2 cm) wide Sparks Rib Cleat Belting. This belt preferably has cross ribbing spaced approximately two inches (5.08cm) apart. This design allows main conveyor belt 11 to move the bags along with it. This design also has a low resistance to the lateral forces that move the bags side to side.

Low resistance to lateral forces means that the bags are able to slip sideways across the surface of main conveyor belt 11 when they encounter some obstruction. If the bags are not able to slip sideways on main conveyor belt 11, then any side forces exerted on them are transmitted to main conveyor belt 11 and as a result main conveyor belt 11 is driven outside of its intended path of travel. This will cause excessive conveyor belt wear and can lead to belt failure. It also increases the likelihood of bags jamming on main conveyor belt 11 as they travel.

Right hand and left hand ¼ turn drive conveyors 41 and 42 preferably use a 16⅛ inch (40.96cm) wide endless spliced Sparks Slip Top Belting. These belts are vulcanized and have a 1/16 inch (0.05cm) thick TOUGH-GRIP top cover and two A-sections notched, jacketed V-guides on the pulley side to assist belt tracking.

Thus it is seen that a telescoping vehicle loading and unloading system is provided that can safely and efficiently unload the cargo shipped in a variety of a transportation vehicles. One skilled in the art will appreciate that the present invention can be practiced by other than the described embodiments, which are presented for purposes of illustration and not of limitation, and the present invention is limited only by the claims that follow.

What is claimed is:

1. An apparatus for moving cargo between a load transport vehicle and a loading dock, comprising:
   a telescoping conveyor means having a front loading end, and a rear discharge end that remains substantially fixed during operation and a driving means operably mounted on said conveyor means for transporting said cargo from said front loading end to said rear discharge end;
   a manipulator means mounted adjacent said front loading end of said telescoping conveyor means having a frame means mounted on said manipulator means for supporting an operator above the front loading end of said conveyor means and a transport means operably mounted on said manipulator means for movement into close proximity with said cargo; and
   an engaging means mounted on said manipulator means having a power means operably mounted on said engaging means for moving said cargo onto said front loading end of said telescoping conveyor means.

2. The apparatus of claim 1 wherein said engaging means is a hemispherical tool having a plurality of spikes protruding therfrom.

3. The apparatus of claim 2 wherein said spikes protrude from said hemispherical tool at angles of between about 45 degrees and about 90 degrees.

4. The apparatus of either of claims 2 or 3 wherein said hemispherical tool has 44 spikes protruding therefrom.

5. An apparatus for moving cargo between a load transport vehicle and a loading dock, comprising:
   a telescoping conveyor means having a main conveyor belt traveling between a front loading end and a rear discharge end that remains substantially fixed during operation and a driving means operably mounted on said conveyor means for transporting said cargo from said front loading end to said rear discharge end;
   a feed means mounted adjacent said front loading end of said telescoping conveyor means having side means mounted on said feed means angled such that the trailing edges of said side means are spaced closer to each other than are the leading edges of said side means for facilitating the loading of said cargo onto said main conveyor belt of said telescoping conveyor means;
   a manipulator means mounted adjacent said front loading end of said telescoping conveyor means having a frame means mounted on said manipulator means for supporting an operator above the front loading end of said conveyor means and a transport means operably mounted on said manipulator means for movement into close proximity with said cargo; and
   an engaging means mounted on said manipulator means having a power means operably mounted on said engaging means for moving said cargo onto said front loading end of said telescoping conveyor means.

6. The apparatus of claim 5 wherein said feed means comprise right hand and left hand ¼ turn drive conveyor belts mounted on either side of said front loading end of said telescoping conveyor means.

7. The apparatus of claim 6 wherein said right hand and left hand ¼ turn drive conveyor belts have a smooth surface.

8. The apparatus of either of claims 5, 6 or 7 wherein said main conveyor belt has a ribbed design.

9. An apparatus for moving cargo between a load transport vehicle and a loading dock, comprising:
   a telescoping conveyor means having a front loading end, a main conveyor section defined by a plurality of belt carrying units nested within one another, and a rear discharge end that remains substantially fixed during operation and a driving means operably mounted on said conveyor means for transporting said cargo from said front loading end to said rear discharge end;
   a means operably connected to said telescoping conveyor means for extending and retracting said belt carrying units;
   a manipulator means mounted adjacent said front loading end of said telescoping conveyor means having a frame means mounted on said manipulator means for supporting an operator above the front loading end of said conveyor means and a transport means operably mounted on said manipulator means for movement into close proximity with said cargo; and
   an engaging means mounted on said manipulator means having a power means operably mounted on said engaging means for moving said cargo onto said front loading end of said telescoping conveyor means.

10. The apparatus of claim 9 further comprising a means operably connected to said telescoping conveyor means for facilitating side to side movement of said telescoping conveyor means.

11. The apparatus of claim 10 wherein said means for facilitating side to side movement of said telescoping conveyor means comprises air flotation pads and cross travel wheels.

12. An apparatus for moving cargo between a load transport vehicle and a loading dock, comprising:
   a telescoping conveyor means having a front loading end, and a rear discharge end that remains substantially fixed during operation and a driving means operably mounted on said conveyor means for transporting said cargo from said front loading end to said rear discharge end;
   a manipulator means mounted adjacent said front loading end of said telescoping conveyor means having a frame means mounted on said manipulator means for supporting an operator above the front loading end of said conveyor means and a transport means operably mounted on said manipulator means for movement into close proximity with said cargo;
   limit means mounted on said manipulator means to limit the movement of said manipulator means;
   an engaging means mounted on said manipulator means having a power means operably mounted on said engaging means for moving said cargo onto said front loading end of said telescoping conveyor means.

13. An apparatus for moving cargo between a load transport vehicle and a loading dock, comprising:
   a telescoping conveyor means having a main conveyor belt traveling between a front loading end and a rear discharge end that remains substantially fixed during operation for transporting said cargo from said front loading end to said rear discharge end, and a main conveyor section defined by a plurality of belt carrying units nested within one another and a driving means for driving said conveyor means;
   a means operably connected to said telescoping conveyor means for facilitating said to side movement of said telescoping conveyor means;
   a means operably connected to said telescoping conveyor means for extending and retracting said belt carrying units;
   right hand and left hand ¼ turn drive conveyor belts mounted on either side of said front loading end of said telescoping conveyor means to facilitate the loading of cargo onto said main conveyor section of said telescoping conveyor means;
   a manipulator means mounted adjacent said front loading end of said telescoping conveyor means having a frame means mounted on said manipulator means for supporting an operator above the front loading end of said conveyor means and a transport means operably mounted on said manipulator means for movement into close proximity with said cargo;
   limit means located on said manipulator means to limit the movement of said manipulator means; and
   a hemispherical tool having a plurality of spikes protruding therefrom mounted on said manipulator means for moving said cargo onto said front loading end of said telescoping conveyor means.

* * * * *